June 6, 1944.    R. LAPSLEY    2,350,909
INDUSTRIAL TRUCK
Filed Jan. 27, 1943    3 Sheets-Sheet 1

INVENTOR.
Robert Lapsley
BY Walter E. Schirmer
Atty.

INVENTOR.
Robert Lapsley
BY Walter E. Schirmer
ATTY.

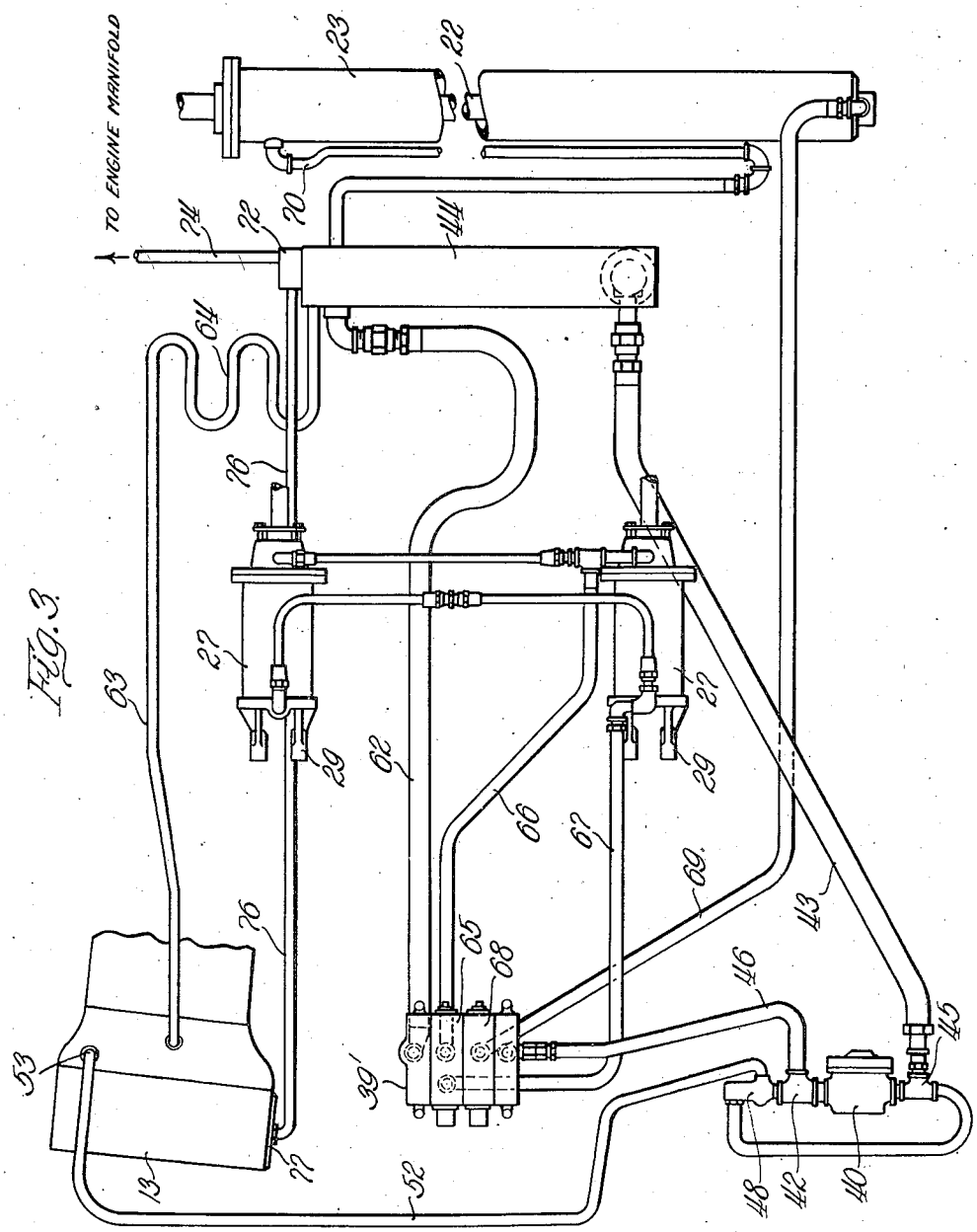

Patented June 6, 1944

2,350,909

UNITED STATES PATENT OFFICE 2,350,909

INDUSTRIAL TRUCK

Robert Lapsley, Berrien Springs, Mich., assignor to Clark Equipment Company, Buchanan, Mich., a corporation of Michigan Application January 27, 1943, Serial No. 474,045

6 Claims. (Cl. 214—113)

This invention relates to industrial trucks, and more particularly is concerned with drive mechanism for such trucks and improvements therein relating to the use of a fluid torque converter in place of the conventional clutch between the engine and the drive axle. The torque converter in combination with a transmission employing forward and reverse gears provides a smooth drive, greatly facilitating the operation of a truck of this type which is adapted to handle merchandise in warehouses, mercantile and manufacturing buildings, especially in starting the truck under heavy loads and moving it into exact positions for tiering or removing tiered merchandise where the truck must be inched into position to facilitate this operation.

One of the primary objects of the present invention is to provide, in an industrial truck having a fluid driving connection between the engine and drive axle, means for insuring delivery of fluid under pressure to the driving connection to prevent introduction of a vacuum therein when the vehicle engine is idling, thereby having the torque converter in position to immediately perform its desired operation since it will always be filled with oil under pressure.

Normally, torque converters have the characteristic of producing a vacuum condition on the non-working sides of the vanes or blades in the torque converter. This is undesirable, and, with the present invention, this is eliminated.

In most industrial trucks of this type which are gasoline engine powered, the tilting mechanism for the vertical uprights upon which the load carriage is supported is operated hydraulically, as is also the lifting means for raising the load supporting carriage vertically in the uprights. This hydraulic operation is produced by means of pistons operating in tilt and lift cylinders, the cylinders being supplied with fluid under pressure from a fluid pump actuated from the engine. However, when neither the lift cylinder or tilt cylinder is operating, but the engine is running, there is produced a certain idling pressure in the pump, which, under normal conditions, merely circulates through the sump. This pressure may be from 0 to 80 pounds per square inch.

The present invention contemplates valve means automatically operable during this idling operation of the pump to transmit the fluid under its idling pressure from the pump through the torque converter and back through the sump or reservoir. However, the moment the control valves for the tilt or lift cylinders are operated, the pressure increase in the fluid line is so great as to close off automatically the connection to the torque converter and the entire pressure of the fluid is transmitted to the tilt or lift cylinders. In the present invention, this is effected preferably by means of a spring controlled valve connected in the pressure outlet side of the pump and having a connection to the torque converter with a return connection from the torque converter to the fluid reservoir.

Another primary object of the present invention is to provide means for removing the fluid which leaks through the seals of the torque converter and restoring it into the fluid line. This is accomplished in the present embodiment of the invention by means of a vacuum connection from the engine manifold to what may be termed a settling tank disposed on top of or within the fluid reservoir, which vacuum, during idling of the engine, is sufficient to draw any leakage oil or fluid from a sump at the bottom of the torque converter into this tank. As the oil accumulates in the tank, it provides a sufficient head which will in turn return it into the common fluid reservoir.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 3 is a view, somewhat diagrammatic, of the fluid circuits of the hydraulic system of such truck;

Figure 1:
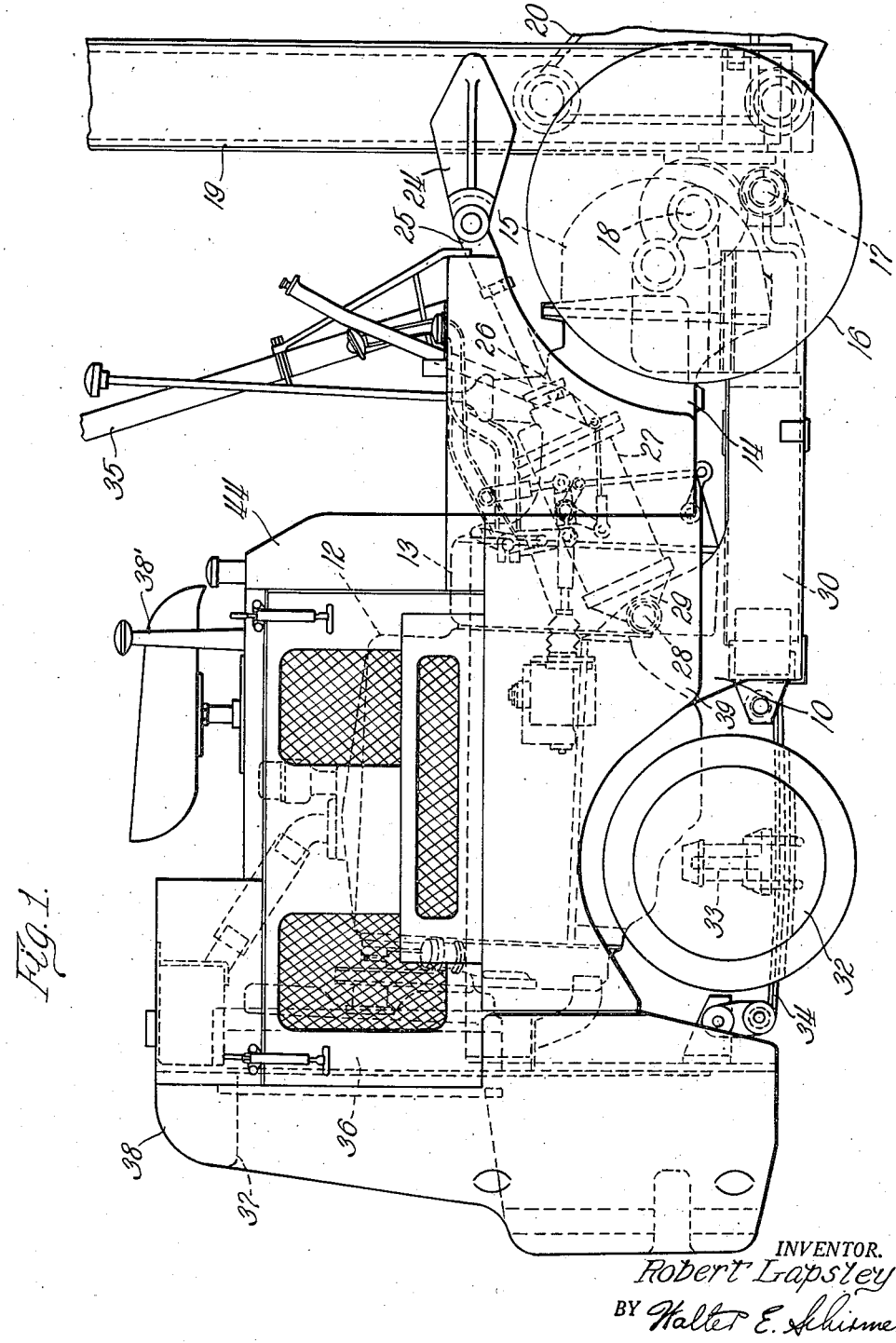
Figure 1 is a side elevational view, somewhat diagrammatic, of an industrial truck embodying the present invention, this truck being of the so-called "finger-lift" type.

Referring now in detail to the drawings, in Figure 1 I have shown an industrial truck generally conforming to that shown in the patent to Elmer J. Dunham, No. 2,256,314, issued September 16, 1941.

This truck in general comprises a pair of side frame members 10 which carry therebetween the gasoline powered engine 12 to which is coupled the fluid torque converter 13, the transmission 14 and the drive axle assembly 15. This axle assembly through intermediate gearing is adapted to drive the forward driving wheels 16 of the truck.

Pivotally mounted on the jackshaft 17 disposed forwardly of the drive axle 18 are a pair of vertically extending channel-shaped uprights 19 in which is supported the load supporting carriage 20 carrying the forwardly extending lift fingers (not shown). The carriage member 20 is adapted to be raised by means of a piston 22 operating in a lift cylinder 23, as shown in detail in Figure 3.

The uprights are provided with a pair of rearwardly extending brackets 24 to which are pivotally connected the thrust arms 25 of piston rods 26 operating in the tilt cylinders 27, these tilt cylinders being pivotally mounted as at 28 to the frame members of the truck by means of clevis shaped brackets 29.

Disposed below the fluid torque converter and transmission, and carried by the frame member is a gasoline tank 30 for supplying gasoline to the engine 12.

Disposed below the engine 12 are the steering wheels 32 of the truck mounted upon the axle 33 and spring supported from the frame by means of the leaf spring 34 in a conventional manner. The wheels have steering connections, as described in the above-mentioned patent controlled through the steering wheel mounted at the top of steering post 35.

The engine 12 is provided with a suitable radiator 36 adapted to receive air through an opening 37 formed in a rear counterweight member 38 secured to the rear end of the frame. Additional counterweights 39 are provided on each side of the vehicle to counter-balance the load carried by the lift fingers.

The remaining details of the truck construction are not important to the disclosure of the present invention, and may be more readily understood from the detailed description thereof set forth in the above-mentioned patent.

Suffice it to say that the controls for the lift and tilt cylinders are operated by a pair of control levers 38' adapted to actuate a suitable valve mechanism 39' shown in Figure 3, which in turn is connected to receive fluid pressure from the pump 40 driven through gearing from the engine 12.

Figure 2:
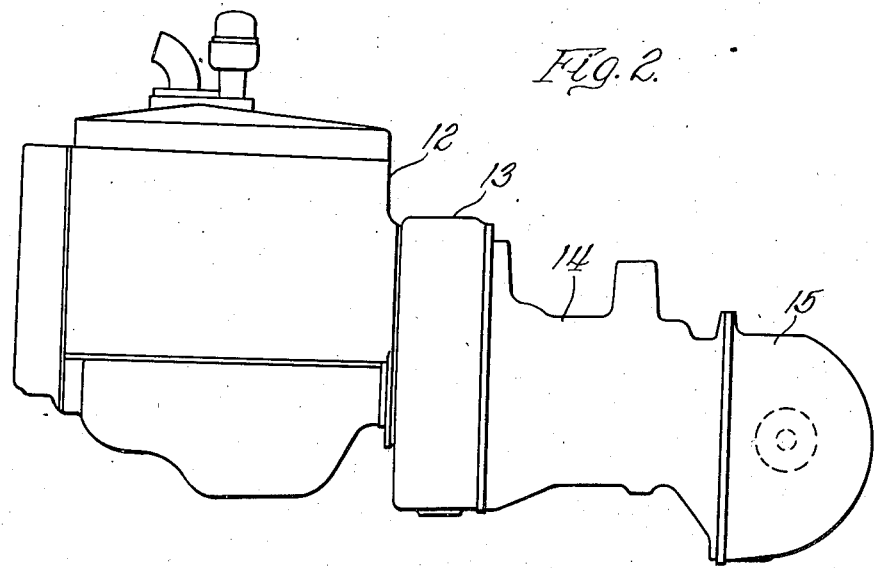
Figure 2 is an elevational view of the power train for the industrial truck.

In Figure 2 there is disclosed in elevation the power driving mechanism including the engine 12, the torque converter 13, the transmission gearing 14 for controlling forward and reverse movement of the vehicle, and the driving axle assembly 15. It will be noted from this figure that the torque converter is coupled between the engine and the transmission gearing, and takes the place of the conventional friction clutch and also eliminates certain of the gears in the transmission, as will be described in more detail in my copending application, Serial No. 480,714, filed March 26, 1943.

Considering now Figure 3 of the drawings, the pump 40 driven from the engine 12 is provided with an inlet T connection 45 which, through the conduit 43, is adapted to receive fluid from the reservoir or sump 44, which is preferably mounted at a level higher than pump 40, as indicated in Figure 1. The outlet side of the pump 40 is connected through the T 42 to the valve mechanism 48, T 42 having one outlet thereof receiving the control valve member 48 shown in more detail in Figure 4. The control member 48 is of generally cylindrical form having the threaded end 49 adapted to thread into the T connection 42 and having an outlet port 50 suitably tapped to receive the conduit 52 leading to the inlet port 53 of the torque converter 13. Within the housing 48 there is provided a valve member 52' including a valve sleeve 53', a slotted portion 54 and a stud end portion 55 about which is centered the coil spring 56 biased at one end against the flange 57 and at the opposite end against the end wall 58 of the valve body 48. The valve sleeve 53' allows the fluid from the T connection 42 to flow thru the large hole 59 into the annular well or chamber 60 formed in the valve body and communicating with the outlet port 50.

When neither the tilt cylinder 27 nor the lift cylinder 23 is in operation, the pressure built up by the pump 40 produces a corresponding pressure in the conduit 46 which is passed through the conduit 62 to the sump 44 under normal conditions with the valve 39' being in neutral position. However, due to the restrictions in this line, a considerable pressure is built up and fluid under pressure passes through the valve 48 and the outlet port 50 into the torque converter 13, thereby reducing the tendency of the torque converter blades to produce a vacuum in the torque converter. The return line for this fluid is indicated at 63 and is connected from the outlet side of the torque converter through the coil 64 to the sump 44. The coil 64 is for the purpose of providing a heat interchanger to reduce the temperature of the oil leaving the torque converter since this oil has performed work in the torque converter and consequently has become heated up.

When either of the control levers 38' is operated to operate either the lift cylinder 23 or tilt cylinders 27, the engine is correspondingly accelerated, and consequently the pressure produced by pump 40 is greatly increased. This pressure reacting in the valve 48 is greater than the pressure of spring 56, causing the valve element 52' to move axially within the valve body, whereupon the sleeve 53' closes off the annular chamber 60, thus cutting off the flow of fluid through line 52 so that the entire fluid pressure is available for the lift and tilt cylinders. The tilt cylinders are controlled by operation of a valve member in a portion 65 of the valve body 39' which opens either the conduit 66 or conduit 67 to fluid pressure, thereby delivering the fluid under pressure to either the forward or rearward ends of tilt cylinders 27 to tilt the uprights 19 either rearwardly or forwardly. The valve body portion 68 of the valve 39' when operated allows fluid under pressure to pass through conduit 69 to the lower end of lift cylinder 23, thereby raising piston 22 to produce a corresponding raising of the load supporting carriage 20. The fluid or air above the piston 22 is returned to the sump through the line 70.

Release of the lift control valve back to neutral position causes the fluid in the lower end of the cylinder 23 to return through the valve 39' to the sump 44 through line 62, the load supporting carriage being lowered by gravity.

Figures 4, 6, 7:
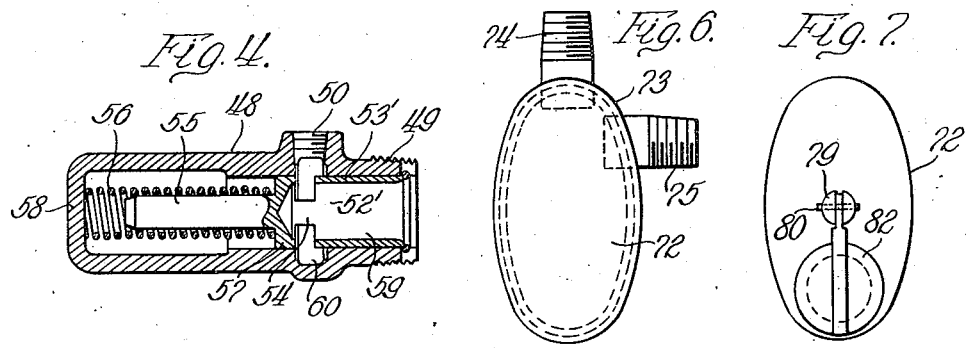
Figure 4 is a sectional view through the spring controlled valve shown in Figure 3.
Figure 6 is an end view of the tank shown in Figure 5.
Figure 7 is an end view of the opposite end of the tank shown in Figure 5.
Figure 5:
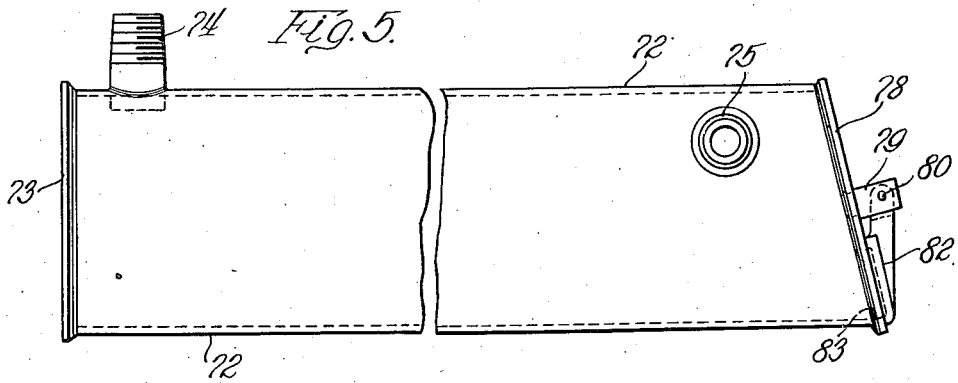
Figure 5 is an elevational view of the auxiliary tank embodied in the fluid reservoir.

On top of or within the sump 44 is an auxiliary tank 72, one form of which is shown in detail in Figures 5 to 7, inclusive. The tank 72 in this form of the invention is an elongated tank extending almost the full width of the sump 44 and being of generally oval shape. It is closed at one end by means of the end cap 73, and adjacent to this end in the top of the tank there is provided the connection 74, which is a small tube connected to the engine manifold to provide for the vacuum of the engine manifold being transmitted to the tank 72. Adjacent the opposite end of the tank is a nipple 75 providing a connection through the somewhat larger conduit 76 to the bottom of the torque converter, this being formed as a sump 77. This sump is adapted to collect fluid leaking through the seals of the converter, and when the vacuum in tank 72 produced by the connection 74 is sufficient to draw this fluid from the sump into the tank, this leakage fluid is removed from the sump and introduced into the tank. The tank is preferably elongated so that any frothing or air embodied in the fluid will have an opportunity of being withdrawn therefrom through the connection 74.

The opposite end of the tank 72 is provided with an end cap 78, which may or may not be angled, carrying a suitable clevis shaped bracket 79 having a transverse pin 80 extending therethrough forming a pivot for a flapper type valve 82. The valve 82 is adapted to normally close the port 83 located at the lower end of the cap 78, but is so positioned and may be so weighted that it closes by gravity, and is held closed only while vacuum is present in the tank 72 through the connection 74. As the oil drawn from the sump 77 begins to fill the tank 72, the head of this oil is sufficient to force the flapper valve open, thereby spilling the contents of the tank 72 into the sump 44. Consequently, this leakage oil is withdrawn from the torque converter, is transmitted to the tank 72 where the air and bubbles incorporated therein are allowed to escape, and the oil is then periodically returned to the sump 44 for re-use in the hydraulic system. If desired, the end cap 78 may be at right angles to the axis of the tank, and the valve may be widened and bored out to provide a cavity for oil whereby this will counteract the weighted portion of the valve to open the same as oil starts to build up in tank 72.

It is therefore believed apparent that the present invention discloses an industrial truck having a fluid drive and so arranged as to take advantage of the fluid in the hydraulic system of the truck itself for use in the torque converter of the hydraulic drive, and also to allow recovery of the leakage fluid in the torque converter with its subsequent return to the hydraulic system of the truck.

I am aware that various changes may be made in the detailed construction of the means by which the present advantages are accomplished, and therefore do not intend to be limited to the specific illustrated embodiments of the invention, but only insofar as defined by the scope and spirit of the appended claims.

I claim:

1. The combination, in an internal combustion engine-driven vehicle having hydraulic means for handling material, a hydraulic system therefor including a pump for developing fluid pressure, said system including hydraulic cylinders for operating said hydraulic means and a driving train for said truck including a fluid torque converter, of a conduit from said pump to said converter, and pressure responsive means between said pump and conduit for directing a portion of the fluid under pressure from said pump through said conduit into said converter only when the fluid pressure in said hydraulic system for operating said cylinders is below a predetermined minimum.

2. In an industrial truck of the class described having an engine, a pump driven thereby, a fluid power transmission system and a hydraulic load control system receiving fluid under pressure from said pump, a fluid reservoir for said hydraulic system, an elongated tank disposed at the upper end of said reservoir and having a fluid inlet leading from said transmission system into the side thereof adjacent one end, a vacuum connection from said engine into the top of said tank adjacent the opposite end thereof, an outlet valve port in said tank away from said connection and connected to said reservoir, and a depending flap-type gravity-controlled valve normally closing said port.

3. The combination set forth in claim 2 wherein said tank is inclined downward slightly from the horizontal toward the end having said valve port therein.

4. In a vehicle having an engine, a fluid torque converter driven thereby, a hydraulic load controlling means, and a pump driven from said engine for supplying fluid under pressure to said hydraulic means, the combination of a pressure responsive valve in the pressure line side of said pump, means in said valve for closing the same upon predetermined increase in pressure in said line, and means for conducting fluid from said valve to said converter when said valve is open.

5. The combination of claim 4 wherein said converter has an outlet connection to the fluid supply side of said pump.

6. The combination, in an internal combustion engine-driven industrial truck of the fork type having a lift cylinder, a tilt cylinder, a hydraulic system therefor including a pump for developing fluid pressure, and a driving train for said truck including a fluid torque converter, of pressure responsive valve means for directing a portion of the fluid under pressure from said pump into said converter when said hydraulic system for said cylinders is inoperative, said valve means closing under predetermined increase of fluid pressure to divert all the fluid from said pump to said hydraulic system.

ROBERT LAPSLEY.